Jan. 11, 1938. H. HÖLLERER 2,104,991
APPARATUS FOR CLEANING AND DEGREASING ARTICLES
Original Filed Sept. 17, 1934
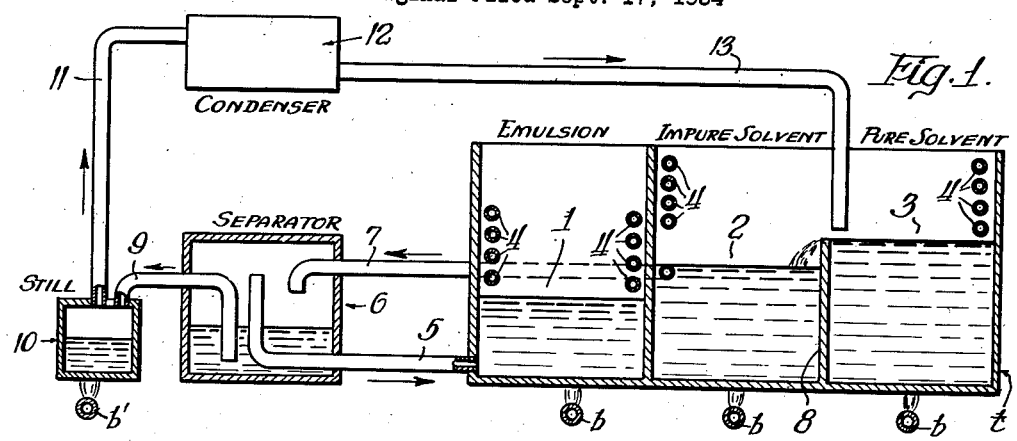
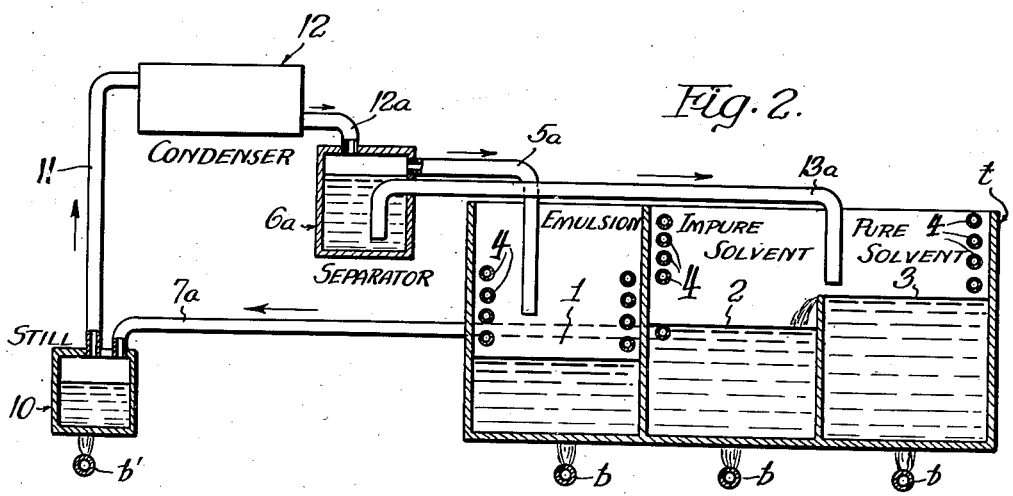
Inventor:
Hanns Höllerer.
By Brown, Jackson, Boettcher & Dienner
Attys.

Patented Jan. 11, 1938

2,104,991

UNITED STATES PATENT OFFICE 2,104,991

APPARATUS FOR CLEANING AND DEGREASING ARTICLES

Hanns Höllerer, Munich, Germany, assignor to Dr. Alexander Wacker Gesellschaft fur Elektrochemische Industrie, G. m. b. H., Munich, Bavaria, Germany Original application September 17, 1934, Serial No. 744,393. Divided and this application April 22, 1935, Serial No. 17,572. In Germany October 20, 1933

5 Claims. (Cl. 87—6)

This invention relates to machines for degreasing and cleaning of various articles, particularly metal articles.

It is known to degrease articles by subjecting them to the action of a suitable solvent, such as a chlorinated hydrocarbon, trichlorethylene being commonly used, in either liquid or vapor form. While this method of degreasing has proven highly satisfactory in many respects, it has been found that, in many instances, small particles of emery, grit, bloom and other foreign materials adhere to the degreased articles and must be removed therefrom, usually by hand, after the degreasing operation. This involves delay and additional work, with corresponding increase in cost of production.

The primary object of my invention is to avoid the above noted objections to the present practice by providing a simple and inexpensive machine for effectively cleaning and degreasing the articles being treated, in a single operation.

Further objects and advantages of my invention will appear from the detail description.

In the drawing:—

Figure 1 is a semi-diagrammatic lengthwise vertical sectional view of a machine embodying my invention, parts being shown in elevation;

Figure 2 is a view similar to Figure 1, of a modified form of machine.

This application is a division of my copending application, Serial No. 744,393, for Process of cleaning, filed September 17, 1934.

I have found that by treating the articles to the action of a suitable emulsion, as a step in the cleaning process, all particles of foreign materials are effectively removed therefrom. The emulsion used may be one of chlorinated hydrocarbons and water, to which may be added well known emulsions of fat or oil, acids and alkalies and their derivatives, as products of sulphonizing processes, such as are used in the textile industry. I can also prepare a suitable emulsion in the following manner—by mixing a component part of a known emulsion, as above, with water and a solvent, such as trichlorethylene, and adding as another component some of the hydro-carbon groups or similar combinations, such as, for example, trioxytriaethylamin. It is advantageous to add to the emulsion an ingredient which will assist in cleaning the articles and will also increase the stability of the emulsion. I find that various substances are suitable for this purpose, including phenols, aliphatic bases, dibutylamin, aromatic bases, as anilin, pyridin, etc. The addition to the emulsion of relatively small amounts, such as ½ to 1% of any of these substances produces satisfactory results.

The emulsion used may vary within wide limits, depending upon the solvent used, the nature of the articles being cleaned, etc. In cleaning metal articles covered with oil or polishing pastes, an emulsion formed of the following ingredients in substantially the proportions stated, by volume, gives satisfactory results— 25% to 30% of trichlorethylene, 1% to 2% of any of the emulsions used in the textile industry, above referred to, ½% to 1% of any of the above stabilizers, and about 70% water.

In practicing my process, the emulsion is preferably heated to a moderately high temperature, depending somewhat on the nature and condition of the articles. The articles are then subjected to the action of the emulsion, conveniently by immersion therein, after which they are subjected to the action of the solvent, in either liquid or vapor form and then are dried. This leaves the articles in a completely degreased and bright and clean condition, free of all particles of foreign materials such as would not be completely removed from the articles by treating them to the action of the solvent alone in accordance with present practice.

If desired, the articles may be subjected to the action of the solvent preliminary to immersion in the emulsion, though ordinarily this is not necessary. It will be obvious that a certain amount of the emulsion will adhere to the articles and will tend to contaminate or dilute the solvent to the action of which the articles are subsequently subjected. I provide, in the machine for carrying out my process, means for obviating this difficulty and also preferably provide means for assuring pure solvent to the action of which the articles are subjected as the final step in the cleaning operation.

The machine shown in Figure 1 comprises a tank $t$, conveniently formed of sheet metal, the interior of which is divided into three compartments 1, 2, and 3. This machine is intended for use with a volatile solvent having a specific gravity higher than that of water. Trichlorethylene has proven satisfactory. Suitable heating devices, in the form of burners $b$ are disposed beneath the respective compartments. Cooling coils 4 are disposed within compartment 1, at each end thereof and above the normal liquid level therein, similar coils 4 being disposed at the inner end of compartment 2 and the outer end of compartment 3, it being noted that partition 8 between compartments 2 and 3 is low relative to the end walls of the tank and the partition between compartments 1 and 2.

Compartment 1 contains the emulsion, tank 2 contains the liquid solvent which may be contaminated by a relatively small amount of emulsion, and tank 3 contains pure solvent, such as trichlorethylene, the normal level of the liquid in the respective compartments being substantially that shown. The liquids are heated to proper operating temperatures by the burners b, and the cooling coils 4 produce cooling zones above the bodies of liquids effective for condensing the solvent vapors and thereby preventing escape thereof to atmosphere, as is known in the art.

A pipe 5 connects compartment 1, adjacent the bottom thereof, to a separator 6 and extends upward within the latter. The separator is also connected by a pipe 7 to compartment 2 a slight distance below the normal liquid level therein, the end of pipe 7 within the separator extending downward a short distance below the upper end of pipe 5.

An approximately U-shaped pipe 9 connects separator 6, adjacent the bottom thereof, with the top of a still 10 disposed adjacent the separator and heated by a burner b'. A take-off pipe 11 extends from the top of still 10 to the inlet of a condenser 12, of known type, the condensate from which is delivered by a pipe 13 into compartment 3.

The articles being treated are immersed in the emulsion in compartment 1, are then immersed in the solvent in compartment 2, which solvent may be contaminated by emulsion remaining on the articles, and are finally immersed in pure solvent in compartment 3. Upon withdrawal of the articles from the solvent in compartment 3, they may be suspended for a short time above the liquid in this compartment, in the zone of the cooling coils 4, where the articles quickly dry. In this manner the articles are effectively degreased and cleaned and leave the machine in a bright and dry condition and free of all particles of foreign materials.

The emulsion carried over from compartment 1 into compartment 2, by the articles being treated, rises to the top of the liquid solvent in the latter compartment, and flows, together with some of the solvent, through pipe 7 into separator 6, in which the heavier solvent is separated by gravity from the lighter emulsion and water. The emulsion and water are returned to compartment 1 through pipe 5. The solvent which flows into separator 6 through pipe 7 collects in the lower portion of the separator and flows through pipe 9 into still 10 in which it is distilled. The solvent vapor from the still flows through pipe 11 into condenser 12, from which the condensed pure solvent is discharged by pipe 13 into compartment 3. The excess pure solvent flows from compartment 3 over partition 8 into compartment 2, from which latter compartment excess solvent and any emulsion therein are delivered to separator 6 by pipe 7. This effectively prevents the accumulation of any emulsion in compartment 3, assuring that the articles are immersed in pure solvent in the final step of the cleaning operation, while also assuring continuous circulation and distillation of the solvent.

In the machine shown in Figure 2, the liquid solvent and the emulsion are delivered from compartment 2, by pipe 7a, to the still 10. The condensate is delivered from condenser 12, by pipe 12a, into separator 6a, from which the liquid solvent flows through pipe 13a into compartment 3, the emulsion and water flowing through pipe 5a into compartment 1.

In the machines of Figures 1 and 2, the still is preferably operated continuously, though this is not essential and in many cases the still may be operated intermittently, as required.

While I have disclosed, by way of example, certain forms of machines suitable for practicing the process of my invention, any other machine suitable for the purpose may be used. As above indicated, and as will be understood by those skilled in the art, changes in construction and arrangement of parts of the machines of my invention may be resorted to, and I intend to include all such variations, as fall within the scope of the appended claims, in this application in which the preferred forms only of my invention are disclosed.

What I claim is:—

1. In a machine for cleaning and degreasing articles, a tank structure normally open for inspection and removal of the articles, said tank structure comprising a first compartment for containing a cleaning emulsion, a second compartment for containing a degreasing solvent at a predetermined normal level therein, and a third compartment for containing a degreasing solvent and having an overflow into said second compartment, a separator, a normally open pipe establishing communication between the first compartment adjacent the bottom thereof and the separator remote from the bottom thereof, a second normally open pipe establishing communication between the separator below the upper end of the first pipe and the second compartment adjacent and below the normal level of the solvent therein, a still communicating with the separator adjacent the bottom thereof, and a condenser connected to the still for receiving the distilled vapors therefrom, said condenser discharging the condensate into said third compartment.

2. In means for cleaning and degreasing articles, an apparatus comprising three compartments, a first compartment for containing a cleaning emulsion, a second compartment for containing a degreasing solvent at a predetermined normal level therein, and a third compartment for containing a degreasing solvent having an overflow into said second compartment, said compartments being open for insertion and removal of the articles, a separator, a normally open pipe establishing communication between said first compartment and the separator remote from the bottom of the latter effective for returning to said first compartment emulsion from said separator, a second normally open pipe opening into the separator below the normal solvent level in said second compartment and opening into the latter adjacent and below the normal solvent level therein, a still communicating with said separator below the point of communication of said first pipe with said separator, and a condenser connected to said still and discharging condensate into said third compartment.

3. In means for cleaning and degreasing articles, an apparatus comprising three compartments, a first compartment for containing a cleaning emulsion, a second compartment for containing a degreasing solvent at a predetermined normal level therein, and a third compartment for containing a degreasing solvent having an overflow into said second compartment, said compartments being open for insertion and removal of the articles, a separator for separating emulsion from the solvent, means for delivering to said separator mixed solvent and emulsion from the upper portion of the body of solvent in said second compartment, means for returning separated emulsion from said separator to said first compartment, a still, means for delivering solvent from the separator to the still, a condenser connected to the still, and means for delivering condensate from said condenser to said third compartment.

4. In means for cleaning and degreasing articles, an apparatus comprising three compartments, a first compartment for containing a cleaning emulsion, a second compartment for containing a degreasing solvent at a predetermined normal level therein, and a third compartment for containing a degreasing solvent having an overflow into said second compartment, said compartments being open for insertion and removal of the articles, and means for withdrawing mixed solvent and emulsion from the upper portion of the body of solvent in said second compartment and separating them and returning the separated emulsion to said first compartment and the separated solvent to said third compartment, as a continuous operation.

5. In means for cleaning and degreasing articles, an apparatus comprising three compartments, a first compartment for containing a cleaning emulsion, a second compartment for containing a degreasing solvent at a predetermined normal level therein, and a third compartment for containing a degreasing solvent having an overflow into said second compartment, said compartments being open for insertion and removal of the articles, means for withdrawing mixed solvent and emulsion from the upper portion of the body of solvent in said second compartment and separating them and returning the separated emulsion to said first compartment, and means for distilling and condensing the withdrawn solvent and returning it to said third compartment.

HANNS HÖLLERER.